United States Patent [19]

VanDenberg et al.

[11] Patent Number: 4,775,166

[45] Date of Patent: Oct. 4, 1988

[54] VEHICLE SUSPENSION BEAM-TO-AXLE CONNECTION

[75] Inventors: Ervin K. VanDenberg, Massillon; Jim Eckelberry, Canton, both of Ohio

[73] Assignee: The Boler Company, Itasca, Ill.

[21] Appl. No.: 140,902

[22] Filed: Dec. 22, 1987

Related U.S. Application Data

[63] Continuation of Ser. No. 393,579, Jun. 30, 1982, abandoned.

[51] Int. Cl.4 .............................................. B60G 5/00
[52] U.S. Cl. ...................................... 280/677; 280/682
[58] Field of Search ..................... 280/104, 676–687

[56] References Cited

U.S. PATENT DOCUMENTS

| | | | |
|---|---|---|---|
| 2,660,450 | 11/1953 | Stigum et al. | 280/680 |
| 3,011,776 | 12/1961 | Reed | 280/687 |
| 3,297,339 | 1/1967 | Hendrickson | 280/681 |
| 3,907,324 | 9/1975 | Mastin | 280/680 |
| 4,184,698 | 1/1980 | Raidel | 280/686 |

FOREIGN PATENT DOCUMENTS

| | | | |
|---|---|---|---|
| 1181315 | 6/1959 | France | 280/680 |
| 6602109 | 8/1967 | Netherlands | 280/680 |
| 989987 | 4/1965 | United Kingdom | 280/676 |

*Primary Examiner*—John J. Love
*Assistant Examiner*—Ross Weaver
*Attorney, Agent, or Firm*—Hall, Myers & Rose

[57] ABSTRACT

An axle-to-beam connection for a vehicle having a beam type suspension system is disclosed. The beam-to-axle connection includes an axle connection, a beam connection and a resilient member located therebetween. The resilient member forms a continuous path between the axle connection and the beam connection such that the axle connection and the beam connection do not directly interface at any point. The axle connection includes a saddle plate, which retains the axle, and a pair of extension plates which are connectable to the saddle plate and extend down along both sides of the beam. The resilient member is of a non-uniform shape and thickness and includes a continuum of loci which is designed and shaped so that each locus assumes its fair share, but not more, of the torsional, vertical and horizontal forces exerted on the resilient member during operation of the vehicle. The axle-to-beam connection is also unique in that the axle is resiliently attached to the beam without affecting the structural integrity of the beam.

12 Claims, 3 Drawing Sheets

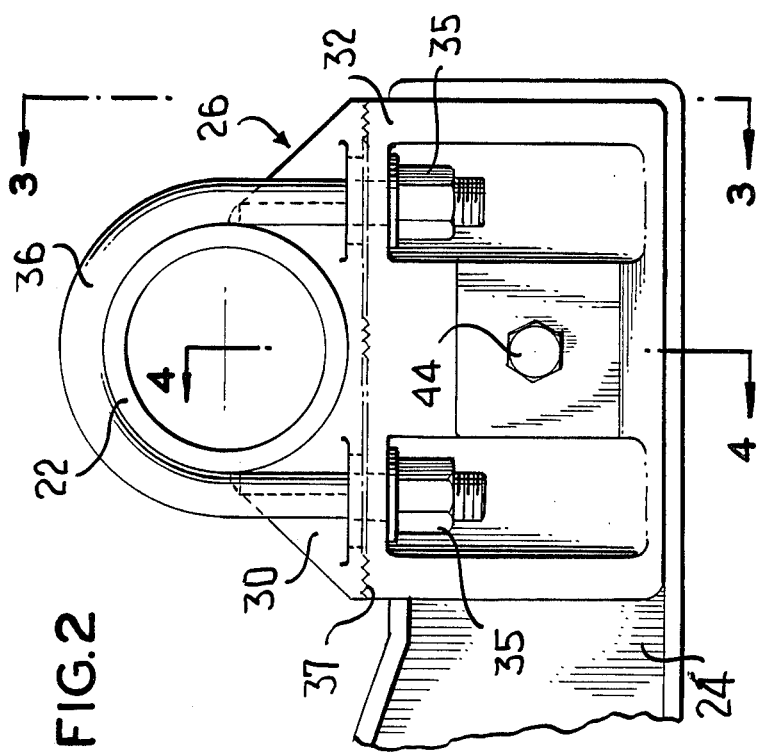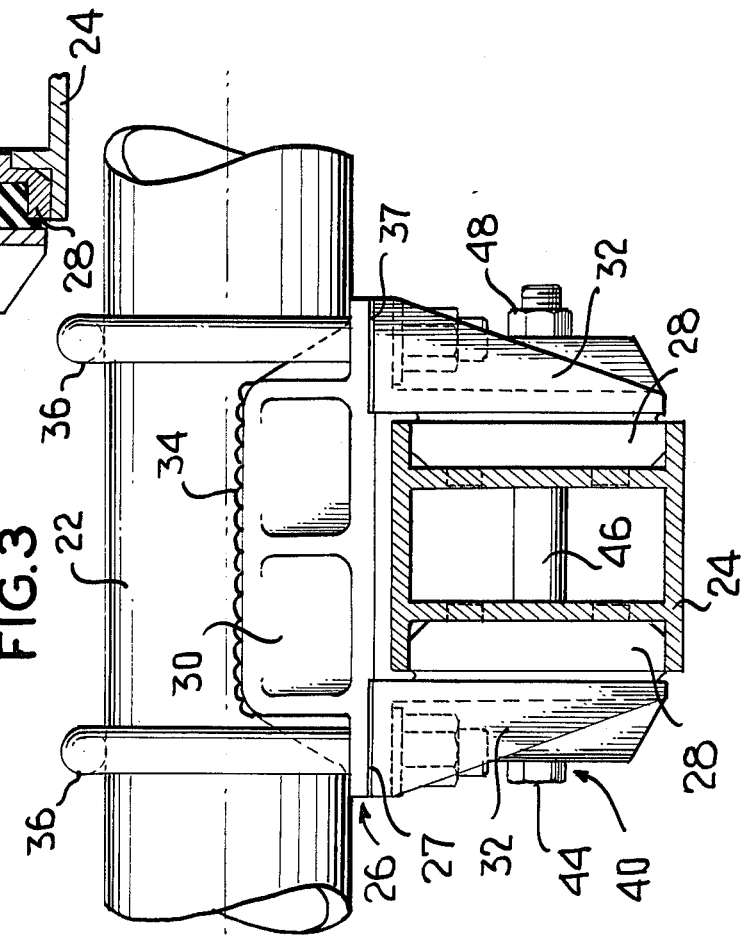

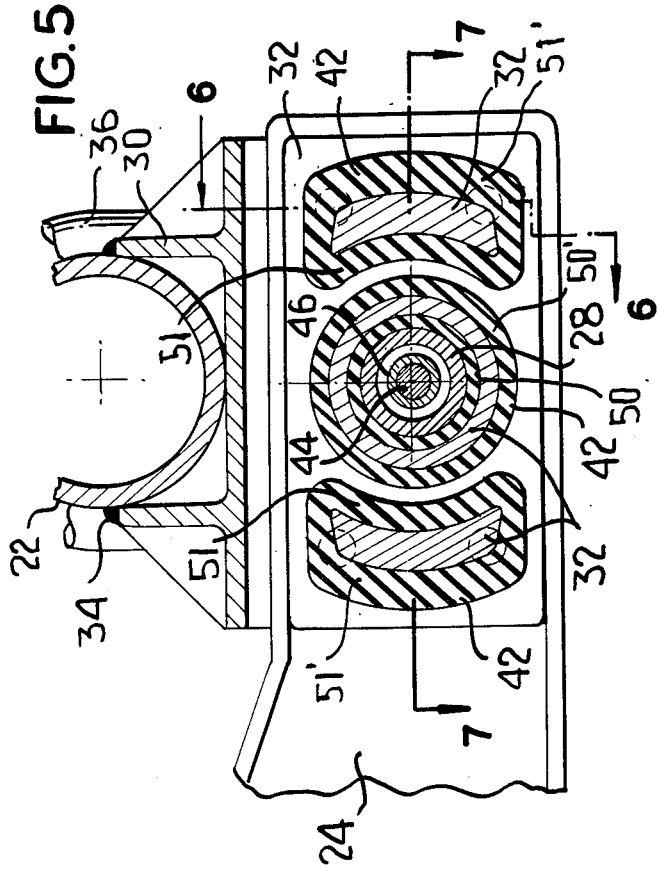
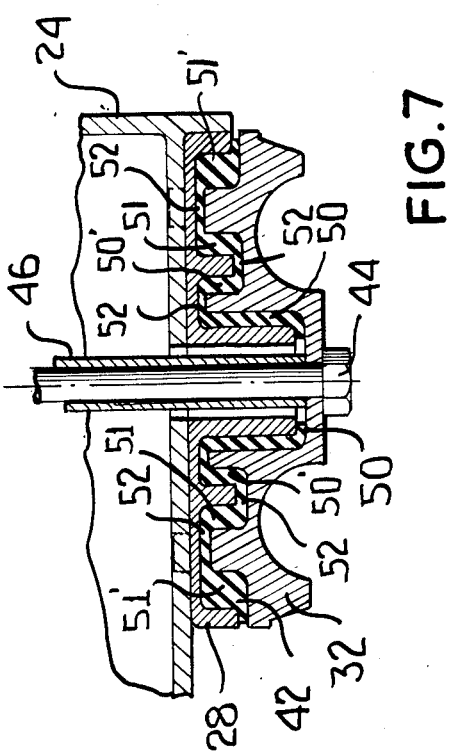
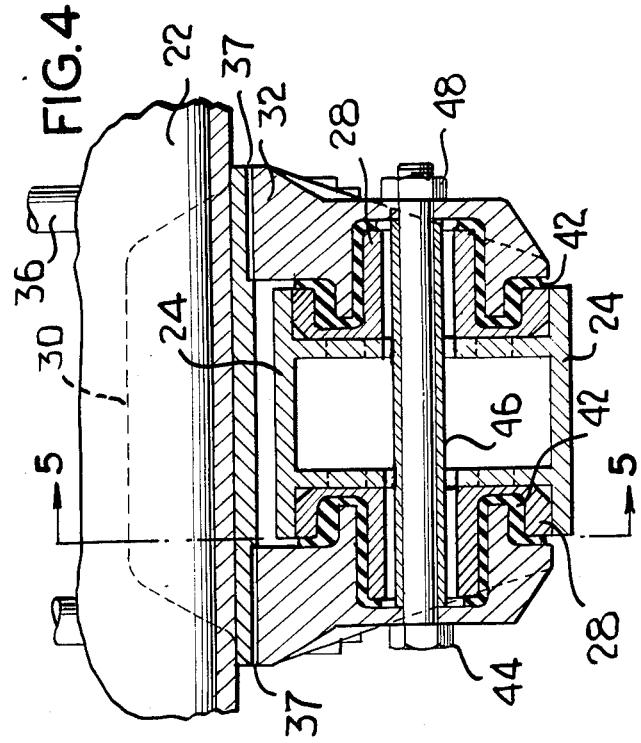
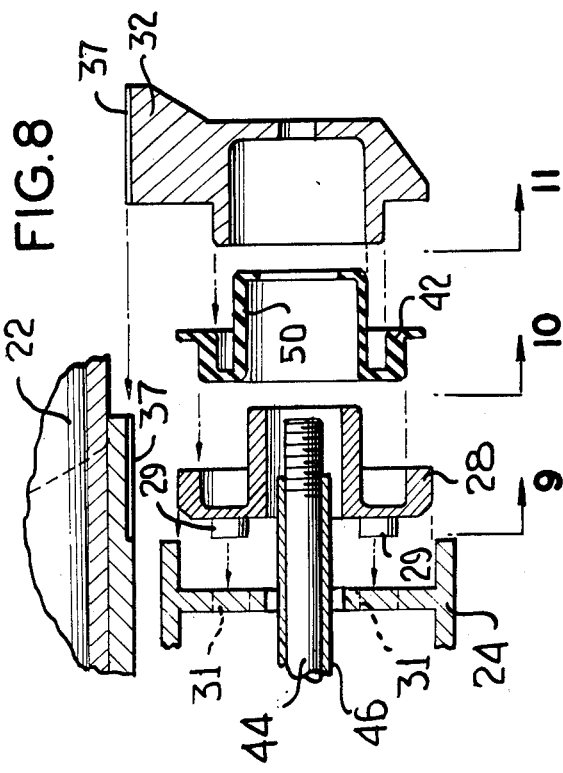

VEHICLE SUSPENSION BEAM-TO-AXLE CONNECTION

This is a continuation of application Ser. No. 393,579, filed June 30, 1982, now abandoned.

BACKGROUND OF THE INVENTION

This invention relates to beam-type suspension systems for wheeled vehicles. More particularly, this invention relates to certain unique axle-to-beam connections for such suspension systems.

Beam-type suspension systems for medium and heavy duty vehicles have been known for many years. Generally, in such a suspension system there is a beam which extends longitudinally and substantially parallel to the frame of the vehicle The beam is usually connected at one end to the frame of the vehicle by a hanger bracket and intermediate its ends to the axle by what may generally be referred to as a "beam-to-axle connection". In certain popular units the beam also has along its length one or more pneumatic chambers (e.g. air bags) which also connect to the frame of the vehicle, thereby to provide an "air-ride" or resilient pneumatic chamber to take up some of the articulation forces and load of the vehicle. At times the beam itself may be a resilient member such as a leaf spring.

In these suspensions further resilient members other than the air bags and/or leaf springs must be employed in order to insure the integrity of the system and to render the ride an acceptable one for the occupant and/or cargo of the vehicle. Such resilient members, however, must not be so resilient as to unacceptably reduce stability or be of such a nature a stop require frequent maintenance and repair.

In the currently known and commercially recognized suspensions of the beam type, the pivotal connection of the beam to the hanger bracket is usually resiliently bushed with an elastomeric the pivotal connection of the beam to meric material and a design decision is then made as to how, if at all, the beam-to-axle connection will be formed. In one popular unit, disclosed in U.S. Pat. No. 3,332,701, two laterally extending, resiliently bushed pins are employed. The pins extend laterally through the beam and between the opposite walls of a saddle connection which in its upper portion houses the axle. The pins may be of uniform cylindrical shape, or they may be shaped and spaced so as to provide for greater flexibility or force control in the axle attachment.

While this type of beam-to-axle connection has been quite popular, and of commercial utility, it is not without its problems. For example, it requires two longitudinal "pins" which are in fact a complex combination of tubes and other parts resulting in the need for one molded part, a bolt and three machined parts for each "pin". Various difficulties also occur with regard to the choice of spacing of the pins and metal-to-metal contact can occur during side loading such as may be experienced during cornering.

U.S. Pat. No. 4,371,190 discloses another type of resilient bushing at the axle-to-beam connection. In this device there is employed a wrap-around bushing extending under and around the beam in a saddle-like housing. While such a device overcame many of the problems of the two pin connection described above as well as previously known wrap-around connections, it requires a single offset pin to handle the axle wrap-up forces, thus adding to the cost of the system. Moreover, a complete wrapping of the beam is required to maintain the larger parts required by this system structurally rigid. In some embodiments, this complete wrapping can make the suspension unacceptably expensive and can present spacing problems.

In yet another known suspension, the axle-to-beam connection is rigid and the articulation forces of the suspension are taken up at the hanger end of the beam by specially designed or multiple bushings located between the beam and the hanger bracket. Such suspensions are disclosed in U.S. Pat. No. 4,166,640. while such suspensions have proven to be an excellent approach and certain embodiments have met with considerable commercial success, in its application it requires specialized and/or multiple tubular bushings which can increase the cost of the suspension system.

From the above, it can be seen that there is a need in the axle suspension art for a beam-to-axle connection assembly which has the common features of efficacy, inexpensiveness, involves no metal to metal contact, minimal interference with the structural integrity of the beam and uniform wearing out of bushings; while retaining the capability of being employed in most medium or heavy duty axle suspension systems as a successful equivalent or superior alternative to the above-described known devices. This invention meets this need in the axle suspension art.

Generally speaking this invention provides an axle-to-beam connection for a wheeled vehicle suspension system having an axle and a beam, wherein said beam is designed to extend longitudinally of the vehicle and to have an upper, a lower, and opposing side surfaces, said axle-to-beam connection comprising an axle connection, a beam connection and means for resiliently connecting said axle connection to said beam connection which comprises a plurality of resilient loci capable of reacting to the torsional, vertical and longitudinal loads experienced by said system, said means being of a size dependant on the motion and force occurring on the means during articulation of the suspension said loci being located proximal the side surfaces of said beam.

In certain embodiments of this invention the plurality of resilient locii varies in depth, height and width and forms a continuous, corrugated longitudinal path between the axle connection and the beam connection.

This invention can be implemented in a suspension system by providing a center of rotation, transverse to the beam and parallel to the axle, in the beam-to-axle connection at one specific point, such as a pinor a bolt. The resilient member containing the resilient loci is then designed around this center of rotation. The resilient member is located between two separate members (e.g. plates) which are separately and fixedly attached to or are a part of the beam and the axle, respectively, and through which all the forces on the beam and axle are transmitted to the resilient member so that all the vertical, lateral and torsional loads exerted on the beam-to-axle connection are concentrated in the resilient member.

Once the center of rotation is provided the resilient material is designed as a series of spaced concentric cylinders or arcual portions having the center of rotation as the center of the cylinders and arcual portions. The circular design of the resilient material is employed so that the torsional forces of the axle-to-beam connection (centered around the center of rotation) are equally distributed amongst and opposed by all the loci comprising the resilient material. The depth of the resilient member (parallel to the axle) is limited by the wheel clearance and also, in some embodiments, by the axle connection member. The thickness of the cylinders and arcual portions is chosen from well-known rubber design handbooks based on the loading which the axle-to-beam connection is designed to withstand and on the physical characteristics of the other elements of the entire axle suspension, as follows.

From the maximum loading which will be exerted on the suspension system and the physical characteristics of the other elements of the suspension system, the spring rate and amount of roll in the suspension system can be determined. The resilient member is then designed for this spring rate and amount of roll to provide for a certain maximum angle of deflection between the axle connection and the beam connection. The rubber in each concentric cylinder or arcual portion must be thick enough so that the rubber does not "pinch out" of its space during maximum deflection. This, of course, means that as the concentric cylinders and arcual portions get farther away from the center of rotation, the thicker the rubber comprising that cylinder or arcual portion must be.

After designing the system to withstand the potential torsional loading, the ability of the system to withstand the potential vertical and lateral loads must be examined by the well-known design technique of determining the "projected area" of the plurality of horizontal and the vertical planes comprising the resilient material to determine if enough rubber is provided for in these planes to withstand the projected vertical and lateral loads which the system will encounter. If the "projected areas" are not large enough, additional thickness can be added to the concentric cylinders, arcual portions or to other portions of the resilient material until enough resilient material is present to withstand the projected vertical and horizontal loads. The concentric design of the resilient material will ensure that the vertical and lateral forces exerted on the resilient material wil be uniformly exerted on the loci comprising the resilient material.

In certain embodiments of this invention, the concentric cylinders and arcual portions may be connected by resilient material so that all the cylinders, arcual portions, etc. comprise a unitary piece of resilient material. It is desirable to alternate the connecting resilient material portions between opposite ends of the concentric cylinders and arcual portions such that the resilient material assumes a corrugated shape so that more surface area of the resilient material is provided for the resilient material to be bonded to the axle and beam connection members. Among other advantages of this design, this will increase the connection's ability to withstand shear forces since the beam and axle connection members can be attached to alternating sides of the cylinders and arcual portions. The connecting resilient members need not be of any substantial thickness since the concentric circles are designed to handle the loading on the resilient member. It is therefore desirable to not bond the connecting resilient material to the beam and axle connection interfacing surfaces since as to do so would provide a weakness in the ability of the resilient material to withstand shear forces.

The resilient material is designed and shaped so that each locus takes substantially its fair share, but no more, of the torsional, vertical and longitudinal forces exerted on the resilient material, resulting in uniform wear of the resilient material.

This feature gives a maximum life to the resilient bushing, thus reducing the time between which the bushings will need to be removed and replaced. This feature also reduces the possibility of an operator driving the vehicle with part of the resilient member being worn out, this reducing the possibility of metal-to-metal contact and wear on the metal surfaces, as well as possible permanent damage to the suspension system.

Another important feature of this invention is that the structural integrity of the beam is not disturbed by the axle-to-beam connection. Small holes may have to be drilled in the beam to provide for the connection of the abutting member and to pass therethrough a means to tie the connection together (e.g. as bolt assembly), but the holes necessary for this are few and too small to affect the structural integrity of the beam. Moreover, it may be necessary to drill these holes in the sidefaces of the beam, and not in the top and bottom plates thereof.

Furthermore, this invention provides that the axle connection and the beam or beam connection do not directly abut, but are interfaced on all opposing faces by a resilient material which may be adhered in part to the axle connection on one side and the beam or beam connection on the opposite side.

This invention will nowbe described with respect to certain embodiments thereof as illustrated in the accompanying drawings, wherein:

IN THE DRAWINGS

FIG. 1 is a side view of a portion of a mechanical trailer suspension embodying the subject invention.

FIG. 2 is a close-up side view of the embodiment of this invention shown in FIG. 1.

FIG. 3 is a cross sectional view taken along reference line 3—3 of FIG. 2.

FIG. 4 is a cross sectional view taken along reference line 4—4 of FIG. 2.

FIG. 5 is a cross sectional view taken along reference line 5—5 of FIG. 4.

FIG. 6 is a partial cross sectional view taken along reference line 6—6 of FIG. 5.

FIG. 7 is a partial cross sectional view taken along reference line 7—7 of FIG. 5.

FIG. 8 is an exploded cross sectional front view of the embodiment of this invention illustrated in FIGS. 1-7.

DETAILED DESCRIPTION OF THE DRAWINGS

Figure 12A:
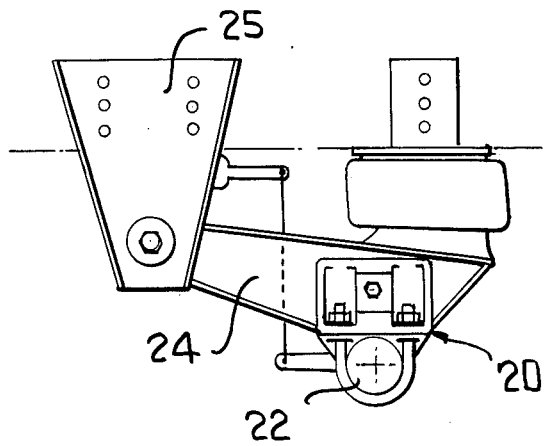
FIG. 12a illustrates the subject invention in the environment of a trailer air ride suspension.

Referring to the Figures, axle-to-beam connection 20 which connects axle 22 with longitudinal beams 24 of a vehicle is shown. Longitudinal beams 24 are usually hung from the frame of the vehicle by hanger brackets 25 (see FIGS. 1, 12a and 12b).

In the embodiment of this invention illustrated in the Figures, axle-to-beam connection 20 includes an axle connection assembly 26, beam connection plates 28 and resilient member 42 which is located and forms a continuous path between axle connection assembly 26 and beam connection plates 28.

Axle connection assembly 26 is rigidly connected to axle 22 and consists of an upper saddle assembly including saddle plate 30 and a pair of lower extension plates 32. Axle 22 rests in saddle plate 30 when axle-to-beam connection 20 is properly assembled and is attached thereto by welds 34. Saddle plate 30 is rigidly attached to lower extension plates 32 by U-bolts 36 and nuts 35. U-bolts 36 extend upwardly through and from holes in saddle plate 30 and a flange of lower extension plates 32 and encompass axle 22. Nuts 35 are then placed on the ends of U-bolts 36 and tightened. Saddle plate 30 and lower extension plates 32 have complementary serrated edges 37 which interlock when nuts 35 are tightened to prevent longitudinal sliding movement between saddle plate 30 and lower extension plates 32.

Figure 9:
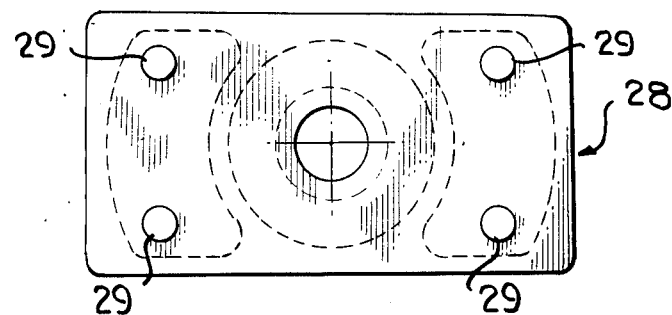
FIG. 9 is a side view taken along reference line 9—9 of FIG. 8.
Figure 10:
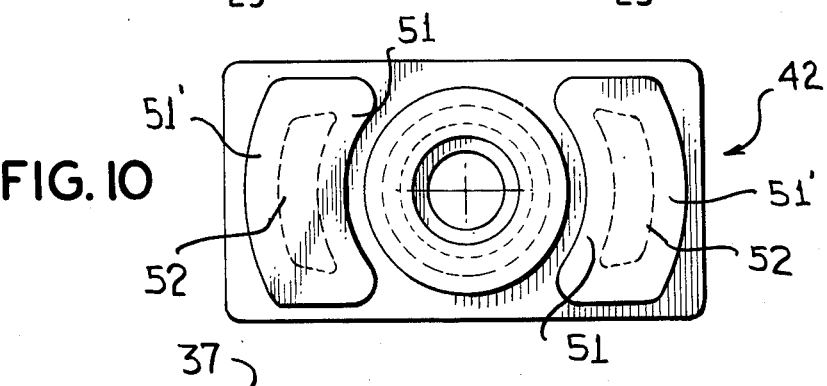
FIG. 10 is a side view taken along reference line 10—10 of FIG. 8.
Figure 11:
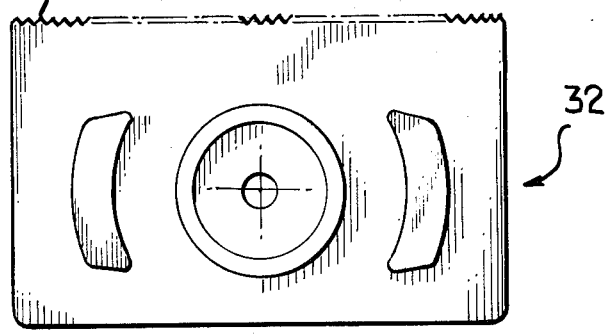
FIG. 11 is a side view taken along reference line 11—11 of FIG. 8.

Beam connection plates 28 are shaped as shown in FIGS. 8 and 9 and are placed abutting the longitudinal walls of beam 24. Note that beam connection plates 28 have protruding buttons 29 which engage complementary holes 31 in beam 24.

Bolt assembly 40 is provided to secure side mount axle-to-beam connection 20, beam 24 and axle 22 together. Bolt assembly 40 is comprised of bolt 44, sleeve 46 and nut 48. Bolt 44 extends completely through the lower extension plates 32, resilent member 42, beam connection plates 28 and beam 24. Sleeve 46 extends between lower extension plates 32 and acts as a spacer therefor. Nut 48 is, of course, attached on the end of bolt 44 when bolt assembly 40 is properly installed and assembled.

Resilient member 42, in this embodiment, is shaped as shown in FIGS. 4-8 and 10 and forms a continuous and complete path between lower extension plates 32 and beam connection plates 28 such that lower extension plates 32 and beam connection plates 28 never directly interface. Some of the advantages of resilient member 42 over the resilient members of the prior art system previously discussed are that resilient member 42 does not interfere with the integrity of the beam and that the member is equally stressed throughout such that each locus of resilient member 42 assumes its fair share, but no more, of the lateral, vertical and torsional forces being exerted on the member 42. This equally stressing is accomplished through the design of resilient member 42 which is described below.

An axle suspension system embodying this invention, as are all axle suspension systems, is designed with certain maximum vehicle load conditions in mind. The types of loads placed on the resilient members of suspension systems during the operation of a vehicle can be broken down into lateral, vertical and torsional loads. From these load design criteria and knowing the physical characteristics of the other elements of the suspension system, the maximum degree of roll in the system and thus the angle of deflection between the beam and the axle can be determined. Resilient member 42 is designed to handle the torsional loads and this deflection as follows.

The embodiment of this invention illustrated in the Figures is designed such that bolt 44 is the center of rotation between beam 24 (and beam connection plates 28) and axle 22 (and axle connection assembly 26). Resilient member 42 is designed around this center of rotation.

Resilient member 42 is comprised, in part, of two concentric cylinders (50 and 50') and two arcual portions or arcs (51 and 51'). The outer surfaces of cylinders 50 and 50' and arcs 51 and 51' are adhered to the opposing surfaces of lower extension plates 32 and beam connection plates 28. Cylinders 50 and 50' and arcs 51 and 51' all have the same centerline which is also the centerline of bolt 44. The height of cylinders 50 and 50' and arcs 51 and 51' is determined by the wheel clearance and by the semicircles provided in lower extension plates 32 to receive the ends of U-bolt 36 and nuts 35.

The thickness of cylinders 50 and 50' and arcs 51 and 51' is determined using well known design handbooks based on the angle of deflection between axle 22 and beam 24 and the torsional loading on resilient member 42. The thickness must be such that the resilient material will not "pinch out" of its space when the system is undergoing the maximum deflection. Note that the thickness of the circles and arcs increases as the distance from the centerline of the cylinder and arcs increases (for example cylinder 50' has a thickness greater than cylinder 50, etc.)

Cylinders 50 and 50' and arcs 51 and 51' are connected by connecting portions 52 which extend between adjacent cylinders and arcs at one end thereof. The primary purpose of connecting portions 52 is to provide the proper spacing between lower extension plates 32 and beam connection plates 28 and to serve as additional "cushioning" protection. The ends of the cylinders and arcs at which connecting portions 42 are located alternate from end to end. For example, in FIG. 7, the connecting portion 52 which connects arcs 51 and 51' is located at the opposite end of arc 51 as the connecting portion 52 which connects arc 51 with cylinder 50'.

This corrugated design increases the ability of resilient member 42 to withstand shear forces since the lower extension plates 32 and beam onnection plates 28 are adhered to alternating sides of cyliders 50 and 50' and arcs 51 and 51'. See for example in FIG. 7 again, where lower extension plate 32 is adhered to the outer surface of arc 51 while beam connection plate 28 is adhered to the inner surface of arc 51, however with respect to the adjacent cylinder 50', lower extension plate 32 is adhered to the inner surface of cylinder 50 while beam connection plate 28 is adhered to the outer surface of cylinder 50'. In addition, it is desirable that connection portions 52 not be adhered to either beam connection plates 28 or lower extension plates 32 as to do so would greatly lessen the ability of resilient member 42 to withstand shear forces.

By using this circular design, and by having the thickness of circles 50 and 50' and arcs 51 and 51' vary depending on the distance from the center, the torsional forces exerted on resilient member 42 are equally distributed throughout the loci of points comprising resilient member 42.

Resilient member 42 is designed to withstand the projected vertical loads as follows. After designing resilient member 42 for the projected torsional loads, the strength of resilient member 42 to withstand vertical loads is checked by determining the amount of resilient material present in the plurality of horizontal planes which comprise resilient member 42 (known in the art as "the projected area"). By knowing the maximum vertical loading the suspension system will be subjected to, the amount of resilient material needed in the horizontal planes can be determined. If this needed amount of resilient material is not provided for after resilient member 42 has been designed for the torsional loads as discussed above, then the dimensions of resilient member 42 can be increased in the horizontal planes until the "projected area" is large enough to handle the projected maximum vertical loads.

After designing the resilient material 42 for the maximum torsional and vertical loads, a quick check, as known in the art, needs to be made as to whether the system is capable of withstanding the maximum horizontal (or lateral) loads that will be exerted on the system. This check is the same as done in the case of the vertical loads except that the projected area of the plurality of longitudinal vertical planes is determined. In all applications of the embodiments of this invention known to the inventors, there will be more than adequate resilient material in the vertical planes to handle the lateral forces after the system has been designed for the torsional and vertical loads. However, if the projected area of the vertical planes of resilient member 42 indicates that resilient member 42 may fail due to lateral loading, the dimensions of the vertical planes of resilient member 42 can be increased until the lateral "projected area" is sufficient. The lateral forces in the embodiment of this invention illustrated in the Figures are exerted on member 42 since the use of bolt assembly 44 to tie the system together results in the transmitting of the lateral forces exerted on the wheels through bolt assembly 44 to the connection of hanger brackets 25 to the frame of the vehicle.

As previously discussed, resilient member 42 is shaped so that it is uniformly loaded as axle-to-beam connection 20 is employed. The loci of points comprising resilient member 42 is designed so that each locus handles its fair share, but not more, of the torsional, vertical and lateral loads exerted on resilient member 42 during the articulation of the suspension system embodying this invention.

In certain embodiments, of this invention, resilient member 42 may have voids designed therein to control the resiliency of resilient member 42 in a specified direction or location. For example, it may be desired to leave connecting portions 52 out of resilient member 42 and either leave a void of material therefor or to replace it with a filler material comprised of a non-resilient material.

Figure 12B:
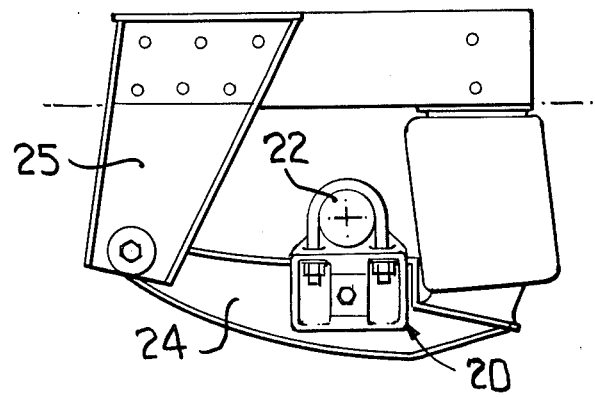
FIG. 12b illustrates the subject invention in the environment of a trailer air ride suspension having a lift axle.

This invention can be used in many medium and heavy duty vehicle axle environments, including, but not limited to a mechanical trailer suspension (see FIG. 1), a trailer air ride suspension (see FIG. 12a) and a trailer air ride suspension having a lift axle (see FIG. 12b).

Once given the above disclosure many other features modifications and improvements will become apparent to the skilled artisan. Such other features, modifications and improvements are, therefore, considered a part of this invention, the scope of which is defined by the following claim.

We claim:

1. An axle-to-beam connection for a wheeled vehicle suspension system having an axle and a beam, wherein said beam is designed to extend longitudinally of the vehicle and to have an upper, a lower, and opposing side surfaces, said axis-to-beam connection comprising:
    an axle connection,
    a beam connection, and
    means for resiliently connecting said axle connection to said beam connection which comprises a plurality of resilient loci capable of reacting to the torsional, vertical and longitudinal loads experienced by said system, said means being of a size dependent on the motion and force occurring on the means during articulation of the suspension, said loci being located proximal the side surfaces of said beam wherein said plurality of resilient loci vary in depth, height and width.

2. An axle-to-beam connection according to claim 1 wherein said axle connection is rigidly attached to said axle.

3. An axle-to-beam connection according to claim 2 wherein said beam connection is rigidly attached to said beam.

4. An axle-to-beam connection according to claim 1, 2, or 3 wherein said plurality of resilient loci height form a continuous, corrugated longitudinal path between the axle connection and beam connection.

5. An axle-to-beam connection according to claim 1 wherein said axle connection comprises an upper saddle means for retaining said axle therewithin and a pair of lower extension plates connectable to said saddle means, and wherein said beam connection comprises a pair of side plate members for engagement with a respective side of said beam, and said plurality of resilient loci are a continuum of resilient material bonded between opposing surfaces of said lower extension plates and their respective side plate members.

6. An axle-to-beam connection for a wheeled vehicle suspension system having an axle and a beam, wherein said beam is designed to extend longitudinally of the vehicle and to have an upper, a lower, and opposing side surfaces, said axle-to-beam connection comprising:
    an axle connection,
    a beam connection, and,
    means for resiliently connecting said axle connection to said beam connection which comprises a plurality of resilient loci capable of reacting to the torsional, vertical and longitudinal loads experienced by said system, said means being of a size dependent on the motion and force occurring on the means during articulation of the suspension, said loci being located proximal the side surfaces of said beam,
    wherein said plurality of resilient loci vary in depth, height and width and form a continuous, corrugated longitudinal path between the axle connection and beam connection,
    wherein said axle connection comprises an upper saddle means for retaining said axle therewithin and a pair of lower extension plates connectable to said saddle means, and wherein said beam connection comprises a pair of side plate members for engagement with a respective side of said beam, and said plurality of resilient loci are a continuum of resilient material bonded between opposing surface of said lower extension plates and their respective side plate members,
    wherein said opposing surfaces of said lower extension plates and side plate members are unequally spaced in a pre-designed manner, and said resilient material fills the unequal space between said opposing surfaces thereby to create said longitudinal corrugated continum of a plurality of loci of varying depth, height and width.

7. An axle-to-beam connection according to claim 6 wherein the connection is substantially free of resilient material proximal the upper and lower surfaces of said beam.

8. An axle-to-beam connection according to claim 7 wherein said resilient member has voids therein at predetermined locations to control the resiliency of the connection in a given direction.

9. An axle-to-beam connection according to claim 1 wherein said connection includes a center of rotation transverse to the beam direction and parallel to the axle direction, said resilient loci being located with respect to said center of rotation such that the forces on the beam and axle are transmitted to the resilient loci in such a manner that all the vertical, lateral and torsional loads exerted on the connection are concentrated in the resilient loci.

10. An axle-to-beam connection for a wheeled vehicle suspension system having an axle and a beam, wherein said beam is designed to extend longitudinally of the vehicle and to have an upper, a lower, and opposing side surfaces, said axle-to-beam connection comprising:
    an axle connection,
    a beam connection, and,
    means for resiliently connecting said axle connection to said beam connection which comprises a plurality of resilient loci capable of reacting to the torsional, vertical and longitudinal loads experienced by said system, said means being of a size dependent on the motion and force occurring on the means during articulation of the suspension, said loci being located proximal the side surfaces of said beam,
    wherein said connection includes a center of rotation transverse to the beam direction and parallel to the axle direction, said resilient loci being located with respect to said center or rotation such that the forces on the beam and axle are transmitted to the resilient loci in such a manner that all the vertical, lateral and torsional loads exerted on the connection are concentrated in the resilient loci,
    wherein said resilient loci comprise a series of spaced concentric cylinder and arcual portions having the said center of rotation as the center of the cylinders and arcual portions.

11. An axle-to-beam connection for a wheeled vehicle suspension system having an axle and a beam, wherein said beam is designed to extend longitudinally of the vehicle and to have an upper, a lower, and opposing side surfaces, said axle-to-beam connection comprising:
    an axle connection,
    a beam connection, and,
    means for resiliently connecting said axle connection to said beam connection which comprises a plurality of resilient loci capable of reacting to the torsional, vertical and longitudinal loads experienced by said system, said means being of a size dependent on the motion and force occurring on the means during articulation of the suspension, said loci being located proximal the siee surfaces of said beam wherein said plurality of resilient loci form a continuous, corrugated longitudinal path between the axle connection and beam connection.

12. An axle-to-beam connection according to claim 4 wherein said axle connection comprises an upper saddle means for retaining said axle therewithin and a pair of lower extension plates connectable to said saddle means, and wherein said beam connection comprises a pair of side plate members for engagement with a respective side of said beam, and said plurality of resilient loci are a continuum of resilient material bonded between opposing surfaces of said lower extension plates and their respective side plate members.

* * * * *